United States Patent
Reinhold et al.

(10) Patent No.: US 9,229,709 B2
(45) Date of Patent: Jan. 5, 2016

(54) POLYPHASIC MODULES FOR SOFTWARE DEVELOPMENT

(75) Inventors: Mark B. Reinhold, Menlo Park, CA (US); Alexander R. Buckley, Cupertino, CA (US); Jonathan J. Gibbons, Mountain View, CA (US); Karen M. P. Kinnear, Boxborough, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 806 days.

(21) Appl. No.: 12/771,121

(22) Filed: Apr. 30, 2010

(65) Prior Publication Data

US 2011/0271254 A1 Nov. 3, 2011

(51) Int. Cl.
*G06F 9/44* (2006.01)

(52) U.S. Cl.
CPC .. *G06F 8/71* (2013.01); *G06F 8/10* (2013.01); *G06F 8/31* (2013.01)

(58) Field of Classification Search
CPC ........................................................ G06F 8/31
USPC ........................................................ 717/120
See application file for complete search history.

(56) References Cited

U.S. PATENT DOCUMENTS

| | | | | |
|---|---|---|---|---|
| 2005/0028151 | A1* | 2/2005 | Roth et al. | 717/162 |
| 2007/0250575 | A1* | 10/2007 | Tseitlin et al. | 709/205 |
| 2008/0320460 | A1* | 12/2008 | Miller et al. | 717/162 |

OTHER PUBLICATIONS

Sun Microsystems, "Project Jigsaw: Language changes for Modules", Feb 10, 2009, https://web.archive.org/web/20090210012949/http://openjdk.java.net/projects/jigsaw/doc/language.html.*

Charles Humble, "Jigsaw Falling Into Place", Jun 24, 2009, http://www.infoq.com/news/2009/06/jigsaw.*

* cited by examiner

*Primary Examiner* — Wei Zhen
*Assistant Examiner* — Lanny Ung
(74) *Attorney, Agent, or Firm* — Park, Vaughan, Fleming & Dowler LLP; Chia-Hsin Suen (57) ABSTRACT

The disclosed embodiments provide a system that facilitates the development and maintenance of a software program. This system includes a software development kit (SDK) and a runtime system for the software program. During operation, the system associates classes of the software program with module declarations for a set of modules and uses the module declarations to manage dependencies in the software program throughout the life cycle of the software program.

20 Claims, 5 Drawing Sheets

POLYPHASIC MODULES FOR SOFTWARE DEVELOPMENT

RELATED APPLICATION

The subject matter of this application is related to the subject matter in a co-pending non-provisional application by inventors Alexander Buckley, Mark Reinhold, and Karen Kinnear and filed on the same day as the instant application entitled "Access Control in Modules for Software Development," having Ser. No. 12/771,654.

The subject matter of this application is also related to the subject matter in a co-pending non-provisional application by inventors Jonathan Gibbons, Alexander Buckley, and Mark Reinhold entitled "Compile-Time Management of Polyphasic Modules," having Ser. No. 12/823,918, and filing date 25 Jun. 2010.

The subject matter of this application is also related to the subject matter in a co-pending non-provisional application by inventors Mark Reinhold, Alexander Buckley, and Jonathan Gibbons, entitled "Dependency Resolution in Polyphasic Modules," having serial number Ser. No. 12/914,499, and filing date 28 Oct. 2010.

BACKGROUND

1. Field

The present embodiments relate to module systems for software development. More specifically, the present embodiments relate to techniques for managing software dependencies using polyphasic modules with reverse dependency constraints.

2. Related Art

Within software systems, increasing sophistication and functionality are typically accompanied by corresponding increases in code size and complexity. For example, the addition of new features to a software program may require the implementation of new components, which in turn may increase the number of dependencies within the software program. Over time, changes to the software program may lead to increases in defects, debugging time, redundancy, and lack of readability. The continued development of a software system without effective complexity management may consequently reduce performance and increase maintenance risk to the point of rendering the software system unusable and/or unmanageable.

Issues associated with increasing software complexity may be mitigated by modularizing software systems. Modular software utilizes components that are self-contained and that facilitate a separation of concerns. For example, individual modules may be developed, tested, and used independently of one another in a software system. In addition, a module's functionality and dependencies may be explicitly declared through an interface provided by the module. Modularized software may thus be significantly more maintainable, easier to understand, and less complex than monolithic software.

Hence, increased use of modularity may improve the design, maintenance, performance, scalability, and growth of software systems.

SUMMARY

The disclosed embodiments provide a system that facilitates the development and maintenance of a software program. This system includes a software development kit (SDK) and a runtime system for the software program. During operation, the system associates classes of the software program with module declarations for a set of modules and uses the module declarations to manage dependencies in the software program throughout the life cycle of the software program.

In some embodiments, each of the modules is uniquely identified by a module identity.

In some embodiments, each module declaration from the module declarations includes at least one of a member, a dependency, and a reverse dependency constraint.

In some embodiments, the reverse dependency constraint specifies the visibility of a module defined by the module declaration to other modules.

In some embodiments, the visibility of the module to a dependent module is based on at least one of:
(i) the name of the dependent module;
(ii) the version of the dependent module; and
(iii) the dependency of the dependent module on the module.

In some embodiments, the life cycle of the software program comprises compilation, testing, packaging, deployment, installation, and execution of the software program.

In some embodiments, the module declarations are obtained separately from source code for the software program.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
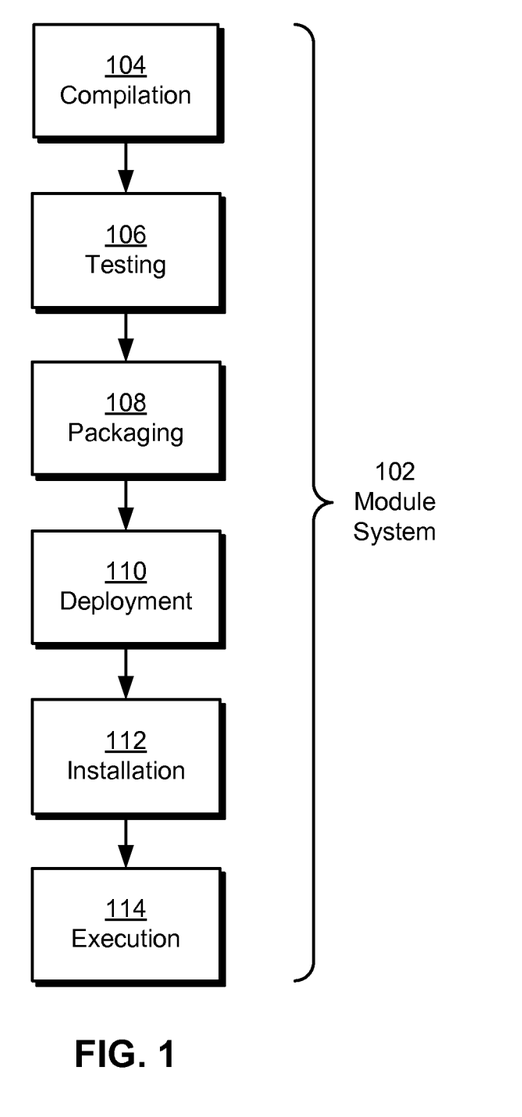
FIG. 1 shows the life cycle of a software program in accordance with an embodiment.

FIG. 1 shows the life cycle of a software program in accordance with an embodiment. The life cycle begins with a compilation 104 phase, in which source code for the software program is converted into an executable format. Next, the compiled software program undergoes a testing 106 phase to detect failures, defects, and/or other issues in the implementation of the software program. For example, testing 106 may be carried out to analyze the correctness, security, scalability, performance, maintainability, and/or usability of the software program.

After testing 106, packaging 108 of the software program may involve creating a software package in an archive format from the software program's executable code. The software package may then undergo deployment 110 and installation 112 on a computer system. For example, a web application may be deployed and installed on a server computer, while a native application may be deployed and installed on multiple personal computers. Finally, execution 114 of the software program allows the software program's intended functionality to be provided to an end user.

Those skilled in the art will appreciate that changes such as patches, upgrades, maintenance, and/or new releases may be periodically made to the software program. Moreover, such changes may be propagated through some or all of the phases of the life cycle. For example, the addition of new features to the software program may require that the software program be recompiled, tested, packaged, deployed, installed, and executed with the new features.

Those skilled in the art will also appreciate that changes to the software program may increase the complexity of the software program, which may eventually interfere with the maintainability, usability, and/or performance of the software program. For example, modifications to the software program may be difficult to document and/or track across all phases 104-114 of the software program's life cycle. Over time, such modifications may interfere with the continued use and development of the software program by obscuring the design of the software program, increasing redundancy, and introducing new, unknown dependencies among components in the software program.

To mitigate issues associated with increased software complexity, a module system 102 may be used to facilitate the development and maintenance of the software program. In one or more embodiments, module system 102 uses modular information at all phases 104-114 of the life cycle to manage dependencies in the software program. As discussed below, such polyphasic modularization may facilitate the development of the software program by improving transparency, cohesion, performance, scalability, and maintainability in the software program.

Figure 2:
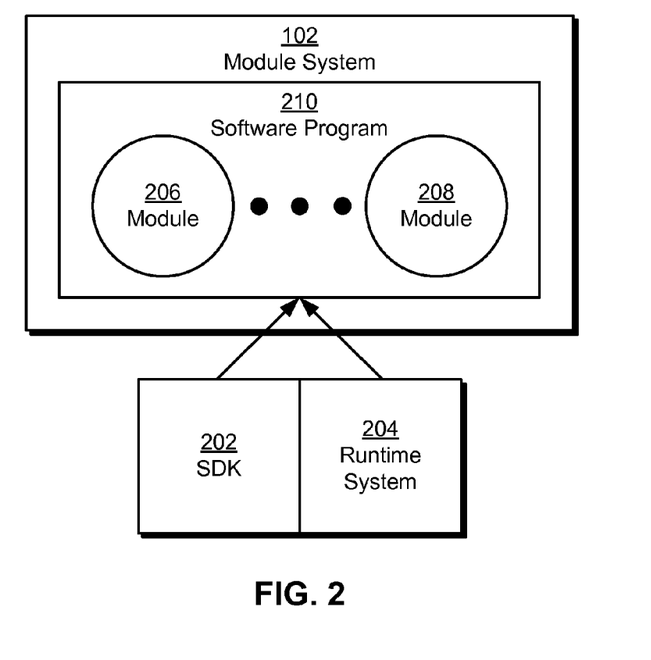
FIG. 2 shows the development and maintenance of a software program using a module system in accordance with an embodiment.

FIG. 2 shows the development and maintenance of a software program 210 using module system 102 in accordance with an embodiment. As shown in FIG. 2, a software development kit (SDK) 202 and a runtime system 204 may interact with module system 102 to manage software program 210 across all stages of the life cycle of software program 210. For example, SDK 202 and runtime system 204 may correspond to the Java (Java™ is a registered trademark of Sun Microsystems, Inc.) Development Kit (JDK) and Java Runtime Environment (JRE).

As mentioned above, module system 102 may use polyphasic modules to facilitate the development of software program 210. In particular, polyphasic modularization of software program 210 may begin with the creation of module declarations for a set of modules 206-208 to be used in software program 210.

In one or more embodiments, modules 206-208 correspond to standalone components in software program 210 that may be independently programmed, tested, and modified. As discussed below with respect to FIGS. 3A-3B, each module 206-208 may be defined, organized, and used through a corresponding module identity and module declaration. In addition, an interface to a module may be based on the members of the module. For example, the module may be accessed through public methods and/or data in the module's members. Logical boundaries between modules 206-208 may further be enforced by enabling inter-module interaction only through the interfaces to the modules, thus effectively hiding implementation details of modules 206-208 from one another.

In other words, modules 206-208 may correspond to encapsulated abstractions of functionality in software program 210 with well-defined capabilities and dependencies. Modules 206-208 may thus provide a large amount of flexibility in organizing the structure of software program 210. For example, Java classes may be grouped into modules 206-208 based on the functionality and/or use of the classes in software program 210 instead of language-based constraints such as package membership.

In one or more embodiments, module declarations for modules 206-208 are obtained separately from source code for software program 210. For example, module declarations for modules 206-208 in a Java program may be stored in "module compilation unit" files (e.g., "module-info.java") that are separate from source files containing Java classes, interfaces, enumerations, and/or annotation types. Such decoupling of module declarations from module implementations may further enable the creation of modules 206-208 based on factors that facilitate the design and development of software program 210, such as separation of concerns, scalability, and performance.

The independent creation and procurement of module declarations may additionally allow module system 102 to begin modularizing software program 210 before software program 210 is compiled. For example, module system 102 may allow module declarations for modules 206-208 to be created (e.g., using SDK 202) before development of source code for software program 210 is complete. Module system 102 may proceed with using the module declarations to manage dependencies in software program 210 through the compilation, testing, packaging, deployment, installation, and execution phases of the life cycle of software program 210.

For example, module system 102 may allow SDK 202 to map modules 206-208 in a Java program from "module-info.java" files to "module-info.class" files during compilation. Module system 102 may additionally provide application-programming interfaces (APIs) that allow compilers, testing frameworks, annotation processors, Java archive tools, Java Virtual Machines (JVMs), and/or other tools and utilities associated with various phases of the life cycle of software program 210 to modularize software program 210 through the "module-info.java" and/or "module-info.class" files. In particular, the tools and/or utilities may use modules 206-208 to perform tasks such as physically dividing large packages into self-contained modules, determining module memberships, resolving dependencies between modules 206-208 (e.g., during compilation), building class paths from module dependencies, and/or providing access control between modules 206-208 (e.g., during execution).

Figure 3A:
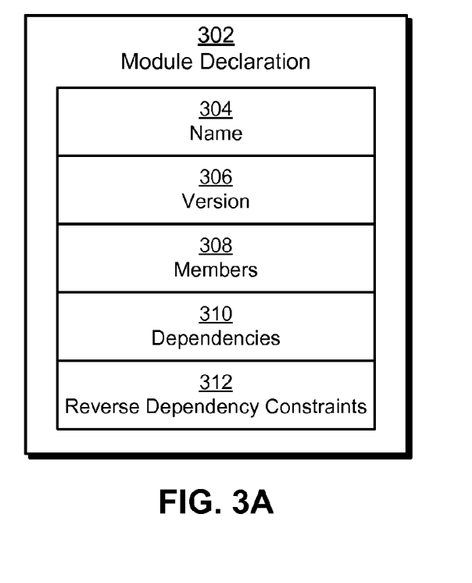
FIG. 3A shows the structure of a module identity in accordance with an embodiment.

FIG. 3A shows the structure of a module declaration 302 in accordance with an embodiment. Module declaration 302 may define a module in a software program (e.g., software program 210 of FIG. 2). In addition, module declaration 302 may be used by a module system (e.g., module system 102 of FIG. 1) to manage dependencies in the software program throughout the life cycle of the software program.

In one or more embodiments, module declaration 302 is associated with a name 304 and a version 306. More specifically, the module defined by module declaration 302 may be uniquely identified by a module identity corresponding to the combination of name 304 and version 306. For example, the module may be identified by placing an "@" symbol between name 304 and version 306. As a result, module identities of "A @ 1.0," "A @ 1.1," "B @ 2.0," and "C @ 2.0" may be used to represent four different modules in the software program. Alternatively, the module identity may correspond to one or more other unique values, such as a timestamp, hash value, and/or numeric identifier.

Module declaration 302 may also be used to determine one or more members 308, dependencies 310, and/or reverse dependency constraints 312 associated with the module. Members 308 may correspond to classes and/or compilation units that belong to the module. Members 308 may be explicitly specified within module declaration 302, declared in source code for classes and/or compilation units, and/or inferred from the directory hierarchy of the software program. Inference of module membership based on directory hierarchy is described in a co-pending non-provisional application by inventors Jonathan Gibbons, Alexander Buckley, and Mark Reinhold and filed on the same day as the instant application, entitled "Compile-Time Management of Polyphasic Modules," having Ser. No. 12/823,918, and filing date 25 Jun. 2010, which is incorporated herein by reference.

Dependencies 310 may correspond to one or more modules on which the module depends. In particular, dependencies 310 on other modules may be declared if one or more members 308 require access to classes in the other modules. Conversely, reverse dependency constraints 312 may be used to restrict the dependence of other modules on the module. In particular, module declaration 302 may include one or more reverse dependency constraints 312 to limit the visibility of the module to a dependent module. Reverse dependency constraints 312 may be based on a number of criteria, such as the names of the dependent modules, the versions of the dependent modules, and/or the dependency of the dependent modules on the module. Reverse dependency constraints are discussed in further detail below with respect to FIG. 4.

Figure 3B:
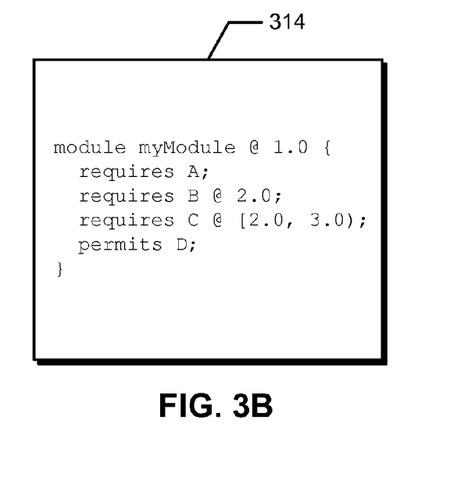
FIG. 3B shows an exemplary module identity in accordance with an embodiment.

FIG. 3B shows an exemplary module declaration 314 in accordance with an embodiment. The first line of module declaration 314 may identify the module by including the "module" keyword followed by the name and version of the module (e.g., "myModule @ 1.0"). In other words, the first line of module declaration 314 may specify the unique module identity for the module. The second, third, and fourth lines may declare three different dependencies of the module using the "requires" keyword. In particular, the first dependency may be satisfied by any version of the "A" module, the second dependency may be met only by version 2.0 of the "B" module, and the third dependency may be met by any version of the "C" module between 2.0 and 3.0.

Module declaration 314 also includes a reverse dependency constraint (e.g., "permits D"). The reverse dependency constraint may be specified using the "permits" keyword and indicate that the module is only visible to modules named "D." In other words, the reverse dependency constraint may limit dependencies on the module by preventing modules that do not meet the reverse dependency constraint from even seeing the module. On the other hand, any module may establish a dependency on the module if module declaration 314 lacks a reverse dependency constraint.

Figure 4:
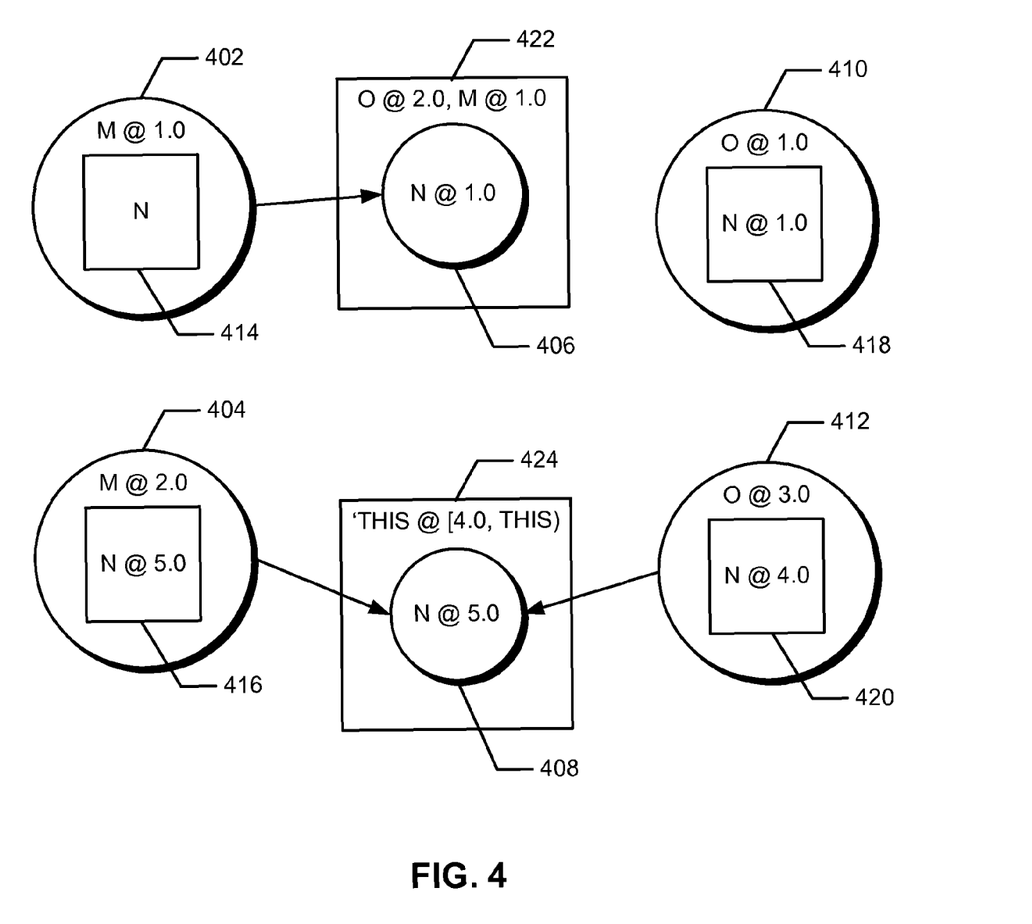
FIG. 4 shows an exemplary set of modules in accordance with an embodiment.

FIG. 4 shows an exemplary set of modules 402-412 in accordance with an embodiment. More specifically, FIG. 4 shows the use of dependencies 414-420 and reverse dependency constraints 422-424 in restricting access and visibility among modules 402-412. As shown in FIG. 4, module 402 has a module identity of "M @ 1.0" and a dependency 414 on a module named "N." Module 404 is identified by "M @ 2.0" and has a dependency 416 on module "N @ 5.0." Module 406 is identified by "N @ 1.0" and includes reverse dependency constraints 422 of "O @ 2.0" and "M @ 1.0." Module 408 is identified by "N @ 5.0" and has a reverse dependency constraint 424 of "THIS @ [4.0, THIS)." Module 410 is identified by "O @ 1.0" and has a dependency 418 on module "N @ 1.0." Module 412 includes a module identity of "O @ 3.0" and a dependency 420 on module "N @ 4.0."

As discussed above, both dependencies 414-420 and reverse dependency constraints 422-424 may affect the dependence of modules 402-412 on one another. Beginning with module 402, dependency 414 is satisfied by module 406. At the same time, reverse dependency constraint 422 permits a module named "M @ 1.0" to depend on module 406. As a result, module 402 is able to satisfy dependency 414 with module 406.

Modules 408 and 412 both have dependencies 416 and 420 on the "N" module but do not satisfy reverse dependency constraint 422. Because module 406 may not be visible to modules 408 and 412, modules 408 and 412 cannot depend on module 406. However, reverse dependency constraint 424 (e.g., "'THIS @ [4.0, THIS)") includes a special operator "'" that limits the visibility of module 408 based on the expression of dependencies by dependent modules. Moreover, reverse dependency constraint 424 may use a self-referencing operator (e.g., "THIS") to describe dependencies on module 408 that satisfy reverse dependency constraint 424. In particular, the use of "THIS" in reverse dependency constraint 424 may allow modules with dependencies (e.g., dependencies 414-420) that include the name of module 408 and versions ranging from 4.0 to the version of module 408 to depend on module 408. Thus, modules 404 and 412 are able to see and depend on module 408.

Finally, module 410 is unable to establish a dependency on another module because module 410 requires a module named "N" but cannot satisfy the reverse dependency constraints 422-424 of either module 406-408 named "N." As discussed above, modules 406-408 may be hidden from module 410 to prevent module 410 from establishing a dependency on either module. Consequently, fine-grained access control may be enabled among modules 402-412 by controlling the overall visibility of each module with a reverse dependency constraint.

Consequently, dependencies 414-420 and reverse dependency constraints 422-424 may establish high cohesion among modules 402-412 by restricting visibility to cooperating modules and preventing non-cooperating modules from relying on the cooperating modules. In turn, increased cohesion among modules 402-412 may facilitate the management of code complexity while increasing code readability and reusability.

Figure 5:
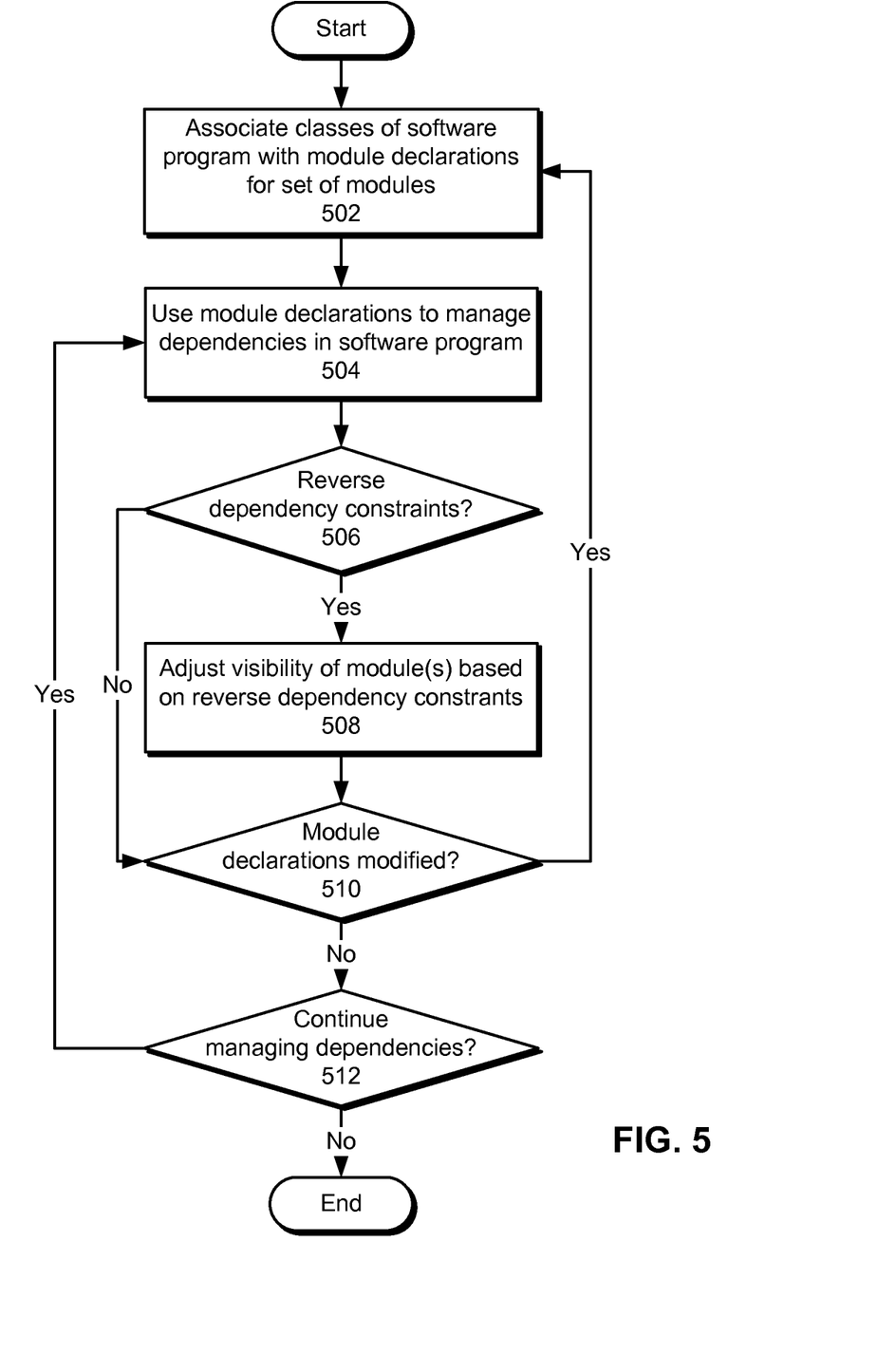
FIG. 5 shows a flowchart illustrating the process of facilitating the development of a software program in accordance with an embodiment.

FIG. 5 shows a flowchart illustrating the process of facilitating the development of a software program in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, classes of the software program are associated with module declarations for a set of modules (operation 502). The module declarations may correspond to definitions for the modules that are obtained separately from source code for the software program. As a result, the module declarations may be created and/or obtained early in the life cycle of the software program and used to manage dependencies in the software program (operation 504) throughout the life cycle. For example, the module declarations may be used to resolve dependencies, hide implementation details, and increase performance during compilation, testing, packaging, deployment, installation, and/or execution of the software program.

The management of dependencies may be affected by reverse dependency constraints in the module declarations (operation 506). In particular, reverse dependency constraints may affect the visibility of modules containing the reverse dependency constraints. If reverse dependency constraints are found, the visibility of one or more modules is adjusted based on the reverse dependency constraints (operation 508). Furthermore, the management of visibility independently of accessibility within the modules may enable fine-grained control of inter-module interaction and dependencies.

The module declarations may continue to be used to manage the dependencies, with or without reverse dependency constraints, until the module declarations are modified (operation 510). If the module declarations are modified, new module declarations containing the modifications are obtained (operation 502), and dependencies in the software are managed using the new module declarations (operations 504-508).

Dependencies may continue to be managed (operation 512) using the module declarations until the software program is no longer used. For example, the module declarations may be modified in response to changes to the software program. Because the changes may be well-documented and managed across all phases of the software program's life cycle, complexity may remain at an acceptable level, while maintainability and usability may be preserved in the software program.

Figure 6:
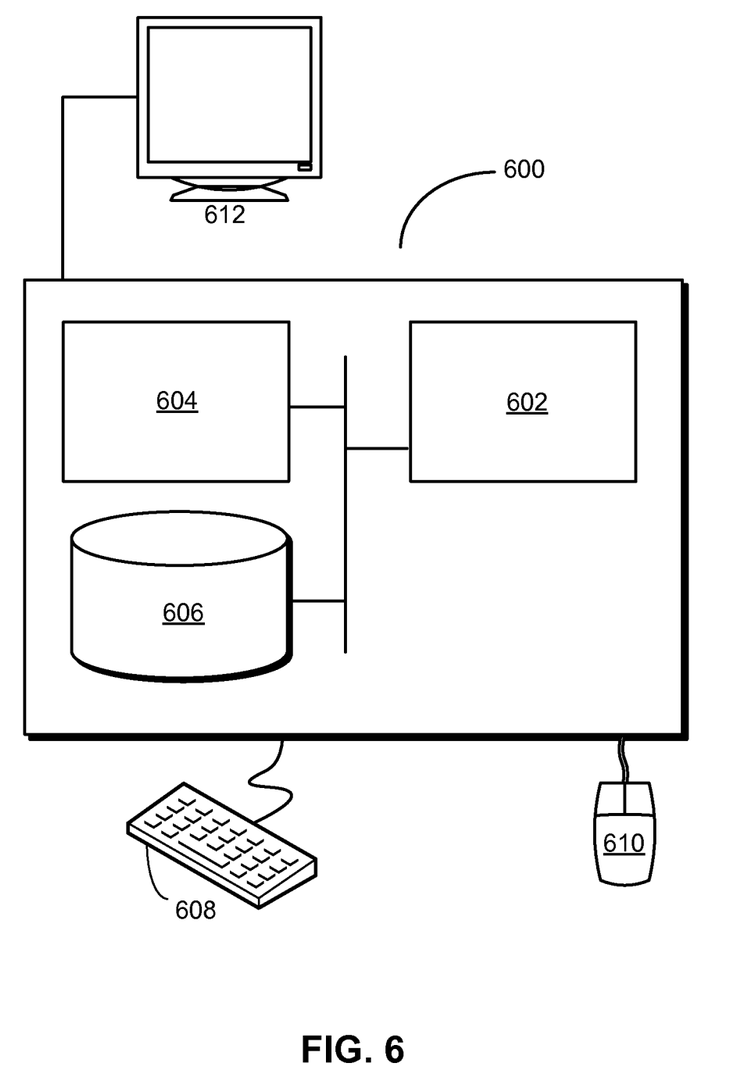
FIG. 6 shows a computer system in accordance with an embodiment.

FIG. 6 shows a computer system in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating the development of a software program. The system may include an SDK and a runtime system. The SDK and runtime system may associate classes of the software program with module declarations for a set of modules. The SDK and runtime system may also use the module declarations to manage dependencies in the software program throughout the life cycle of the software program.

In addition, one or more components of computer system 600 may be remotely located and connected to the other components over a network. Portions of the present embodiments (e.g., SDK, runtime system, etc.) may also be located on different nodes of a distributed system that implements the embodiments. For example, the present embodiments may be implemented using a cloud computing system that provides a module system for managing the life cycles of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method, comprising:
   associating classes of a software program with module declarations for a set of modules; and
   using the module declarations to manage dependencies in the software program throughout a life cycle of the software program;
   wherein a first module declaration of the module declarations comprises a reverse dependency constraint for a first module within the set of modules;
   wherein the reverse dependency constraint limits a visibility of the first module towards one or more dependent modules based on one or more dependencies for the one or more dependent modules; and
   wherein determining whether a second module is allowed to depend on the first module comprises:
      allowing the second module to depend on the first module if the second module declares at least one dependency that satisfies the reverse dependency constraint; and
      hiding the first module from the second module if the second module does not declare at least one dependency that satisfies the reverse dependency constraint.

2. The computer-implemented method of claim 1, wherein each of the modules is uniquely identified by a module identity.

3. The computer-implemented method of claim 1, wherein each module declaration from the module declarations includes at least one of:
   a member;
   a dependency; and
   a reverse dependency constraint.

4. The computer-implemented method of claim 1, wherein the visibility of the first module to the one or more dependent modules is further based on at least one of:
   a name of the dependent module; and
   a version of the dependent module.

5. The computer-implemented method of claim 1, wherein the life cycle of the software program comprises compilation, testing, packaging, deployment, installation, and execution of the software program.

6. The computer-implemented method of claim 1, wherein the module declarations are obtained separately from source code for the software program.

7. The computer-implemented method of claim 1, wherein the module declarations are stored in one or more files that do not include source code for the software program.

8. The computer-implemented method of claim 1, wherein a name of the reverse dependency constraint refers to a name of the first module and wherein the reverse dependency constraint refers to a version of the first module to define a version range.

9. The computer-implemented method of claim 1:
   wherein the reverse dependency constraint comprises a module name and a module version range;
   wherein the second module declares at least one dependency that satisfies the reverse dependency constraint if the at least one dependency specifies that the second module depends on a module with the module name and a module version that falls within the module version range.

10. A system, comprising:
    a processor;
    a software development kit (SDK) for a software program; and
    a runtime system for the software program coupled to the processor,
    wherein the SDK and the runtime system are configured to:
        associate classes of the software program with module declarations for a set of modules; and
        use the module declarations to manage dependencies in the software program throughout a life cycle of the software program,
    wherein a first module declaration of the module declarations comprises a reverse dependency constraint for a first module within the set of modules;
    wherein the reverse dependency constraint limits a visibility of the first module towards one or more dependent modules based on one or more dependencies for the one or more dependent modules; and
    wherein determining whether a second module is allowed to depend on the first module comprises:
        allowing the second module to depend on the first module if the second module declares at least one dependency that satisfies the reverse dependency constraint; and
        hiding the first module from the second module if the second module does not declare at least one dependency that satisfies the reverse dependency constraint.

11. The system of claim 10, wherein each of the modules is uniquely identified by a module identity.

12. The system of claim 10, wherein each module declaration from the module declarations includes at least one of:
    a member;
    a dependency; and
    a reverse dependency constraint.

13. The system of claim 10, wherein the visibility of the first module to the one or more dependent modules is further based on at least one of:
    a name of the dependent module; and
    a version of the dependent module.

14. The system of claim 10, wherein the life cycle of the software program comprises compilation, testing, packaging, deployment, installation, and execution of the software program.

15. The system of claim 10, wherein the module declarations are obtained separately from source code for the software program.

16. A non-transitory computer-readable storage medium storing instructions that when executed by a computer cause the computer to perform a method, the method comprising:
    associating classes of a software program with module declarations for a set of modules; and
    using the module declarations to manage dependencies in the software program throughout a life cycle of the software program,
    wherein a first module declaration of the module declarations comprises a reverse dependency constraint for a first module within the set of modules;
    wherein the reverse dependency constraint limits a visibility of the first module towards one or more dependent modules based on one or more dependencies for the one or more dependent modules; and
    wherein determining whether a second module is allowed to depend on the first module comprises:
        allowing the second module to depend on the first module if the second module declares at least one dependency that satisfies the reverse dependency constraint; and
        hiding the first module from the second module if the second module does not declare at least one dependency that satisfies the reverse dependency constraint.

17. The computer-readable storage medium of claim 16, wherein each of the modules is uniquely identified by a module identity.

18. The computer-readable storage medium of claim 17, wherein each module declaration from the module declarations includes at least one of:
    a member;
    a dependency; and
    a reverse dependency constraint.

19. The computer-readable storage medium of claim 16, wherein the visibility of the first module to the one or more dependent modules is further based on at least one of:
    a name of the dependent module; and
    a version of the dependent module.

20. The computer-readable storage medium of claim 16, wherein the life cycle of the software program comprises compilation, testing, packaging, deployment, installation, and execution of the software program.

* * * * *